No. 635,017. Patented Oct. 17, 1899.
C. B. JACOBS.
PROCESS OF MAKING BENZIN AND HOMOLOGUES.
(Application filed Oct. 12, 1898.)
(No Model.)

WITNESSES:
Geo. B. Rowley.
Elizabeth Ewing.

INVENTOR
Charles B. Jacobs.
BY
his ATTORNEY

UNITED STATES PATENT OFFICE.

CHARLES B. JACOBS, OF EAST ORANGE, NEW JERSEY, ASSIGNOR TO THE AMPERE ELECTRO-CHEMICAL COMPANY, OF SAME PLACE.

PROCESS OF MAKING BENZIN AND HOMOLOGUES.

SPECIFICATION forming part of Letters Patent No. 635,017, dated October 17, 1899.

Application filed October 12, 1898. Serial No. 693,305. (No specimens.)

*To all whom it may concern:*

Be it known that I, CHARLES B. JACOBS, a citizen of the United States, and a resident of East Orange, in the county of Essex and State of New Jersey, have invented certain new and useful Improvements in Processes of Manufacturing Benzene, Anthracene, and other Polymerized Products of Acetylene, together with Metallic Oxids, of which the following is a specification.

The object of this invention is to provide a cheap, simple, and effective process for the manufacture of benzene, anthracene, naphthalene, and other hydrocarbons which are homologues of benzene, together with metallic oxids.

The invention is based upon a discovery made by me that when a metallic carbid is decomposed by a fusible hydrate the products of the reaction are an oxid and benzene and its homologues, which latter may be condensed in a hydraulic main or otherwise and subsequently separated by the ordinary process.

In carrying out my process the carbid and hydroxid are ground and intimately mixed in their molecular equivalent proportions and then subjected in a suitable retort to a temperature sufficient to fuse the hydroxid. The latter reacts upon the carbid, its hydrogen combining with the carbon and its oxygen with the base of the carbid. It is necessary only to provide sufficient heat to start the reaction, after which the heat of reaction is sufficient to continue the operation until the whole of the carbid and hydrate have been decomposed.

The process may be carried out in any suitable apparatus. A simple organization is shown in the accompanying drawings, in which—

Figure 1:
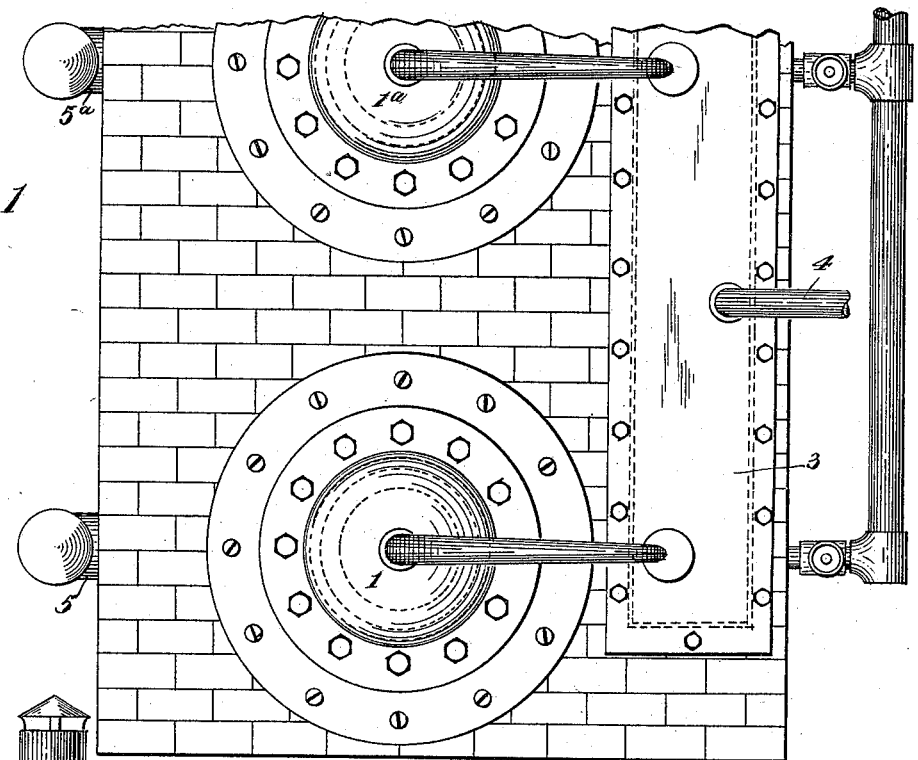
Figure 2:
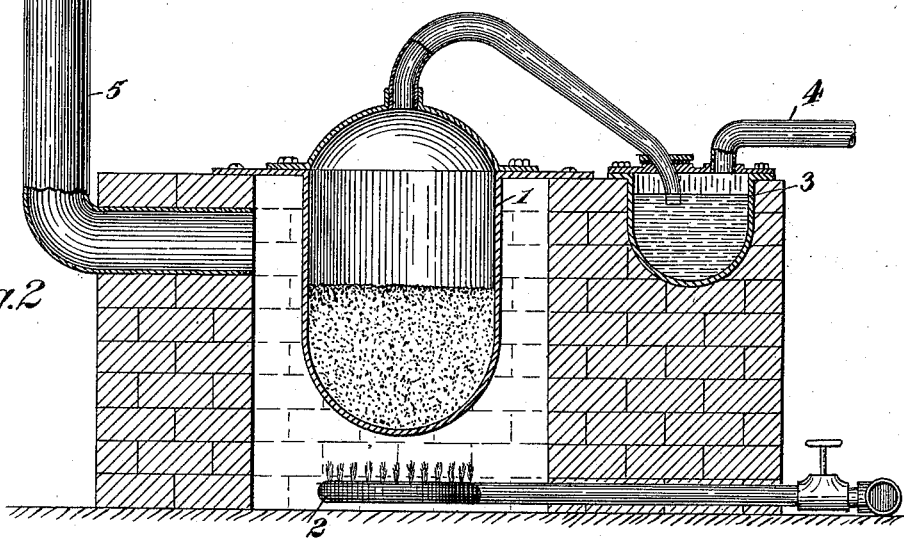

Figure 1 is a plan view, and Fig. 2 a sectional elevation, of a convenient form of apparatus.

It comprises a series of retorts 1 1ª, &c., to contain the charge of mixed carbid and hydrate, mounted on a suitable foundation and having below the same a series of gas-burners 2. The neck of the retort connects with the hydraulic main 3 by a gas-tight joint, and from the top of the main proceeds a pipe 4, which may be led to a suitable gas-holder for storing the non-condensible products of the reaction. The products of combustion from the furnace may be discharged through a chimney 5 5ª. Any carbid and hydrate may be used to charge the retort. For example, with barium carbid and barium hydrate the following reaction will occur:

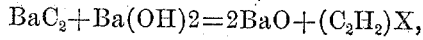

the formula $(C_2H_2)X$ representing the polymerized products. It is not essential that the hydrate should be of the same metal as the base of the carbid. For example, with calcium carbid sodium hydrate may be used to a good advantage, thus:

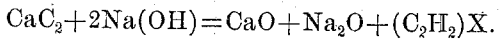

The hydrate may with advantage be selected with reference to the desired heat of decomposition and in this way the character of the product measurably controlled, the hydrates which give up the greatest amount of heat in their decomposition being used when the desired polymerized product has a high heat of formation.

It will be noted that in addition to the hydrocarbons produced by this process there is formed a metallic oxid—namely, in the case specified, the oxid of barium. The oxid so produced possesses advantageous features, among which may be mentioned a high degree of purity and condition of extreme porosity. Both of these properties eminently fit it for use in certain applications—for example, the production of oxygen. My invention includes the production of oxid in this manner according to the above-described process.

Having thus described my invention, what I claim as new, and desire to secure by Letters Patent, is—

1. The process which consists in melting together molecular equivalent weights of finely-ground metallic carbid with a metallic hydrate, whereby hydrocarbons and metallic oxids are produced; substantially as described.

2. The process of producing hydrocarbons consisting in mixing together a metallic carbid and a fusible metallic hydrate of molecular equivalent weights and subjecting the mass to a heat sufficient to fuse the hydrate.

3. The process of producing benzene and its homologues consisting in subjecting in a closed retort a mixture of a pulverulent metallic carbid and a hydrate of molecular equivalent weights to a temperature sufficient to fuse the hydrate, and then condensing the hydrocarbons evolved in the reaction.

In testimony whereof I have hereunto subscribed my name this 1st day of October, A. D. 1898.

CHARLES B. JACOBS.

Witnesses:
 ALICK G. MACANDREW,
 CHARLES S. BRADLEY.